United States Patent
Yeo et al.

(10) Patent No.: US 12,287,914 B2
(45) Date of Patent: Apr. 29, 2025

(54) METHOD FOR CONTROLLING VIRTUAL REALITY CONTENT AND WEARABLE ELECTRONIC DEVICE SUPPORTING THE SAME

(71) Applicant: SAMSUNG ELECTRONICS CO., LTD., Suwon-si (KR)

(72) Inventors: Jaeyung Yeo, Suwon-si (KR); Sungoh Kim, Suwon-si (KR); Choelmin Park, Suwon-si (KR); Chungwan Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/368,932

(22) Filed: Sep. 15, 2023

(65) Prior Publication Data
US 2024/0094805 A1 Mar. 21, 2024

Related U.S. Application Data

(63) Continuation of application No. PCT/KR2023/012197, filed on Aug. 17, 2023.

(30) Foreign Application Priority Data

Sep. 15, 2022 (KR) .................. 10-2022-0116590
Nov. 15, 2022 (KR) .................. 10-2022-0152898

(51) Int. Cl.
*G06F 3/01* (2006.01)
(52) U.S. Cl.
CPC .................... *G06F 3/011* (2013.01)
(58) Field of Classification Search
CPC ........ G06F 3/011; A63F 13/812; A63F 13/22; A63F 13/428; A63F 13/57; A63F 2300/8082
See application file for complete search history.

(56) References Cited

U.S. PATENT DOCUMENTS

| | | |
|---|---|---|
| 9,448,407 B2 | 9/2016 | Kimura |
| 9,729,864 B2 | 8/2017 | Stafford |

(Continued)

FOREIGN PATENT DOCUMENTS

| | | |
|---|---|---|
| CN | 113284258 B | 11/2021 |
| KR | 10-2018-0038175 A | 4/2018 |

(Continued)

OTHER PUBLICATIONS

International Search Report dated Nov. 7, 2023 issued by the International Searching Authority in International Application No. PCT/KR2023/012197(PCT/ISA/210).

(Continued)

*Primary Examiner* — Amit Chatly
*Assistant Examiner* — Chayce R Bibbee
(74) *Attorney, Agent, or Firm* — Sughrue Mion, PLLC

(57) ABSTRACT

A wearable electronic device includes a display, and at least one processor connected to the display, where the at least one processor is configured to obtain a first space necessary for a motion of a user corresponding to a motion of an avatar, the motion of the avatar being performed in a virtual space of virtual reality (VR) content displayed through the display, obtain a second space for safely performing the motion of the user, set a scale value, based on the first space and the second space, and based on obtaining the motion of the user, determine, using the set scale value, a size of the motion of the avatar, the motion of the avatar being performed by the motion of the user.

18 Claims, 15 Drawing Sheets

(56) References Cited

U.S. PATENT DOCUMENTS

| | | |
|---|---|---|
| 9,836,652 B2 | 12/2017 | Lection et al. |
| 10,055,887 B1 | 8/2018 | Gil et al. |
| 10,168,857 B2 | 1/2019 | Alnatsheh et al. |
| 10,222,860 B2 | 3/2019 | Chen et al. |
| 10,311,638 B2 | 6/2019 | Da Veiga et al. |
| 10,410,432 B2 | 9/2019 | Bastide et al. |
| 10,416,837 B2 | 9/2019 | Reif |
| 10,691,945 B2 | 6/2020 | Bostick et al. |
| 10,832,477 B2 | 11/2020 | Bailey et al. |
| 10,832,484 B1 | 11/2020 | Silverstein et al. |
| 10,859,831 B1 | 12/2020 | Pollard et al. |
| 10,901,215 B1 | 1/2021 | Newcombe et al. |
| 10,942,617 B2 | 3/2021 | Ekambaram et al. |
| 10,952,479 B2 | 3/2021 | Mohapatra et al. |
| 11,002,965 B2 | 5/2021 | Abdollahian |
| 11,026,024 B2 | 6/2021 | Sahota et al. |
| 11,095,985 B2 | 8/2021 | Poornachandran et al. |
| 11,099,638 B2 | 8/2021 | Johnson et al. |
| 11,107,224 B2 | 8/2021 | Cho et al. |
| 2013/0328928 A1 | 12/2013 | Yamagishi et al. |
| 2014/0168266 A1 | 6/2014 | Kimura |
| 2015/0061998 A1* | 3/2015 | Yang ................. G06F 3/04815 345/156 |
| 2017/0103574 A1 | 4/2017 | Faaborg et al. |
| 2018/0093186 A1 | 4/2018 | Black et al. |
| 2018/0373412 A1* | 12/2018 | Reif ................. G06F 3/04815 |
| 2020/0167003 A1 | 5/2020 | Nonomura et al. |
| 2020/0357175 A1 | 11/2020 | Silverstein et al. |
| 2021/0183135 A1* | 6/2021 | Lin ................. G06T 15/04 |
| 2021/0280065 A1 | 9/2021 | Kwatra et al. |
| 2021/0283503 A1 | 9/2021 | Challinor |
| 2022/0005234 A1 | 1/2022 | Kwatra et al. |

FOREIGN PATENT DOCUMENTS

| | | |
|---|---|---|
| KR | 10-2124748 B1 | 6/2020 |
| KR | 10-2020-0089872 A | 7/2020 |
| KR | 10-2401955 B1 | 5/2022 |
| WO | 2021/112998 A1 | 6/2021 |
| WO | 2021/183736 A1 | 9/2021 |

OTHER PUBLICATIONS

Written Opinion dated Nov. 7, 2023 issued by the International Searching Authority in International Application No. PCT/KR2023/012197(PCT/ISA/237).

* cited by examiner

METHOD FOR CONTROLLING VIRTUAL REALITY CONTENT AND WEARABLE ELECTRONIC DEVICE SUPPORTING THE SAME

CROSS-REFERENCE TO RELATED APPLICATION

[1] This application is a continuation of International Application No. PCT/KR2023/012197, filed on Aug. 17, 2023, in the Korean Intellectual Property Receiving Office, which is based on and claims priority to Korean Patent Application No. Korean Patent Application No. 10-2022-0152898, filed on Nov. 15, 2022, in the Korean Intellectual Property Office, and Korean Patent Application No. 10-2022-0116590, filed on Sep. 15, 2022, in the Korean Intellectual Property Office, the disclosures of which are incorporated by reference herein in their entireties.

BACKGROUND

1. Field

The disclosure relates to a method for controlling virtual reality content and a wearable electronic device supporting the same.

2. Description of Related Art

An increasing number of services and additional features are being offered through wearable electronic devices such as augmented reality (AR) glasses, virtual reality (VR) glasses, and head mounted display (HMD) devices. To meet the needs of various users and raise use efficiency of electronic devices, communication service carriers or device manufacturers are competing to develop electronic devices with differentiated and diversified functionalities. Accordingly, various functions that are provided through wearable electronic devices are evolving.

VR glasses, when worn on the user's head, may provide a realistic experience to the user by displaying virtual images. VR glasses can replace the usability of smartphones in a variety of areas, such as gaming entertainment, education, and social networking services. Through VR glasses worn on the head, users may be provided with life-like content and interact with the content to feel present in a virtual world.

VR glasses may control VR content based on the motion of the VR glasses caused by the motion of the user's head while wearing the VR glasses, an input through a controller, and/or the motion of a sensor attached to the user's body. For example, the VR glasses may detect the movement of the user (or the movement of the VR glasses) while VR content is being provided. VR glasses may allow an avatar (also referred to as a "character") corresponding to the user to perform actions corresponding to the user's motions in the virtual space of the VR content. For example, the VR glasses may detect the motion of the user's hand holding a controller (or the motion of the controller held in the hand) while VR content is being provided. The VR glasses may allow the avatar corresponding to the user to perform the action corresponding to the hand motion in the virtual space of VR content.

While the user wearing VR glasses moves or controls VR content by moving her hand, the user may collide with a dangerous object positioned around the user. To avoid collisions with dangerous objects, the VR glasses may set a safe zone around the user to ensure that the user safely receives VR content.

When the size of the safe zone set around the user is smaller than the size of the space formed by the user's motion that may be input through the VR glasses to control the VR content, it may be difficult for the user to be immersed in the VR content. For example, when the user's motion for controlling VR content is performed outside the set safe zone, the VR glasses may stop providing VR content or output information indicating a warning to the user. In this case, it may be difficult for the user to be immersed in VR content. Accordingly, it is necessary to allow the user to safely perform motions for controlling VR content without disturbing immersion in VR content.

SUMMARY

Provided are method for controlling virtual reality (VR) content and a wearable electronic device implementing the same, which may adaptively adjust the size of the space necessary to perform the user's motion for controlling VR content, thereby allowing the user to safely perform motions for controlling VR content without disrupting immersion in VR content.

Additional aspects will be set forth in part in the description which follows and, in part, will be apparent from the description, or may be learned by practice of the presented embodiments.

According to an embodiment, a wearable electronic device may comprise a display and at least one processor. The at least one processor may be configured to obtain a first space necessary for a motion of a user corresponding to a motion of an avatar, the motion of the avatar being performed in a virtual space of virtual reality (VR) content displayed through the display. The at least one processor may be configured to obtain a second space for safely performing the motion of the user. The at least one processor may be configured to, set a scale value, based on the first space and the second space. The at least one processor may be configured to, based on obtaining the motion of the user, determine, using the set scale value, a size of the motion of the avatar, the motion of the avatar being performed by the motion of the user.

According to an embodiment, a method for controlling VR content by a wearable electronic device may comprise obtaining a first space necessary for a motion of a user corresponding to a motion of an avatar, the motion of the avatar being performed in a virtual space of the VR content displayed through a display of the wearable electronic device (401). The method may comprise obtaining a second space for safely performing the motion of the user. The method may comprise setting a scale value, based on the first space and the second space. The method may comprise, based on obtaining the motion of the user, determining, using the set scale value, a size of the motion of the avatar, the motion of the avatar being performed by the motion of the user.

In an embodiment, a non-transitory computer-readable medium stores computer-executable instructions configured to, when executed, enable a wearable electronic device including at least one processor to obtain a first space necessary for a motion of a user corresponding to a motion of an avatar, the motion of the avatar being performed in a virtual space of virtual reality (VR) content displayed through the display. The computer-executable instructions may be configured to, when executed, enable the wearable electronic device including the at least one processor to obtain a second space for safely performing the motion of the user. The computer-executable instructions may be configured to, when executed, enable the wearable electronic device including the at least one processor to set a scale value, based on the first space and the second space. The computer-executable instructions may be configured to, when executed, enable the wearable electronic device including the at least one processor to, based on obtaining the motion of the user, determine, using the set scale value, a size of the motion of the avatar, the motion of the avatar being performed by the motion of the user.

According to an embodiment, a method for controlling virtual reality content and a wearable electronic device supporting the same may adaptively adjust the size of the space necessary to perform the user's motion for controlling VR content to thereby allow the user to safely perform motions for controlling VR content without disturbing immersion in VR content.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
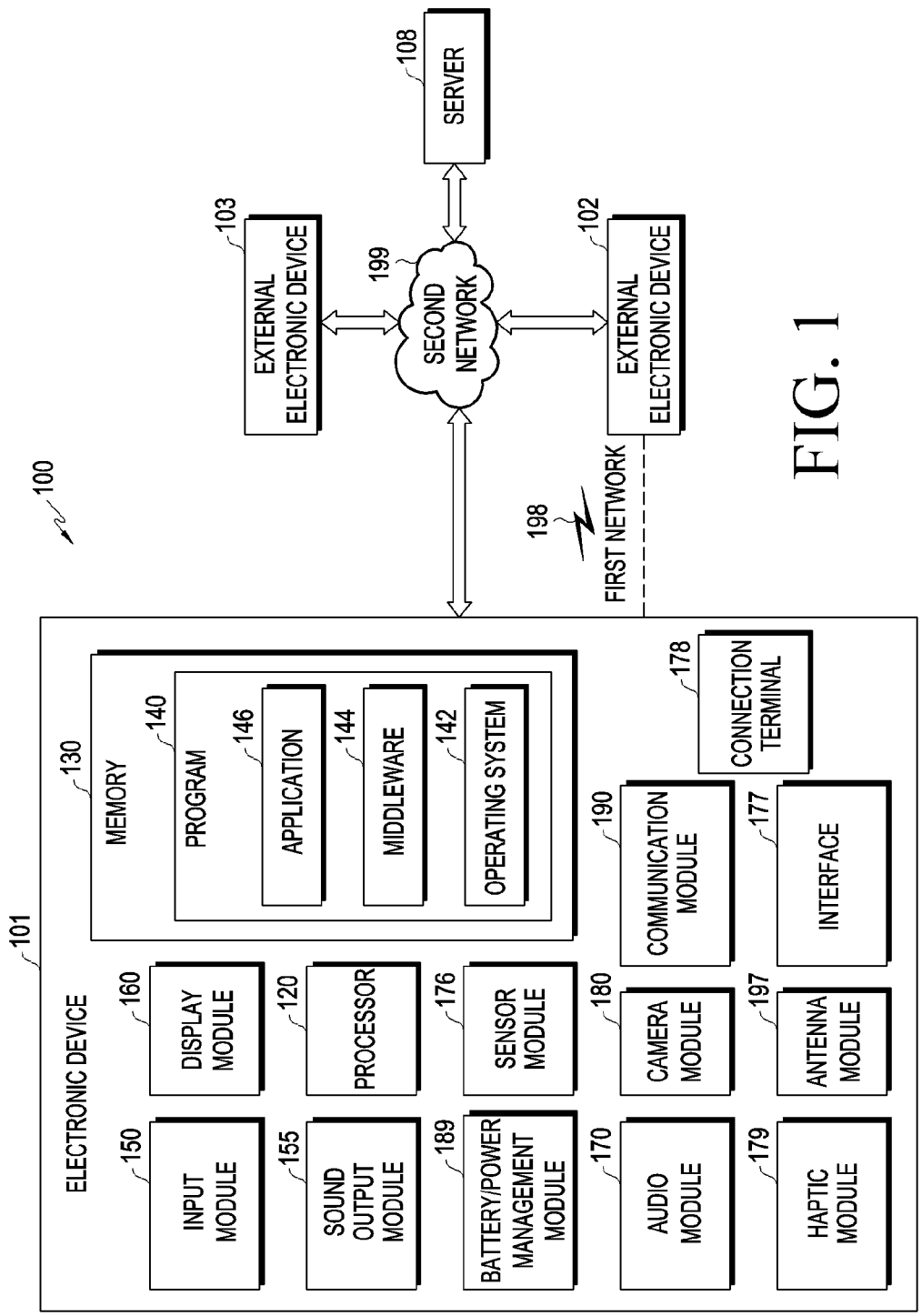
FIG. 1 is a block diagram illustrating an electronic device according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

FIG. 1 is a block diagram illustrating an electronic device 101 according to an embodiment.

The electronic device 101 may be, for example, a wearable electronic device worn on the user's head, such as augmented reality (AR) glasses, virtual reality (VR) glasses, and/or a head mounted display (HMD) device. The electronic device 101 may also be referred to as a wearable electronic device.

The external electronic devices 102 and 103 each may be a device of the same or a different type from the electronic device 101. According to an embodiment, all or some of operations to be executed at the electronic device 101 may be executed at one or more of the external electronic devices (external electronic devices 102 and 103 or server 108). For example, if the electronic device 101 performs a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. For example, the external electronic device 102 may render and transfer, to the electronic device 101, content data executed on an application, and the electronic device 101 receiving the data may output the content data to a display module. If the electronic device 101 detects the user's motion through, e.g., an inertial measurement unit (IMU) sensor, the processor 120 of the electronic device 101 may correct the rendering data received from the external electronic device 102 based on the motion information and output it to the display module 160. Alternatively, the electronic device 101 may transfer the motion information to the external electronic device 102 and request rendering so that screen data is updated accordingly. According to various embodiments, the external electronic device 102 may be various types of devices, such as a smart phone or a case device capable of storing and charging the electronic device 101.

According to an embodiment, the electronic device 101 may communicate with an electronic device 102 via a first network 198 (e.g., a short-range wireless communication network), and/or an electronic device 103 or a server 108 via a second network 199 (e.g., a long-range wireless communication network). According to an embodiment, the electronic device 101 may communicate with another electronic device via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module and/or a battery 189, a communication module 190, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

According to an embodiment, the processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the audio module 170, the sensor module 176, communication module 190, etc.) onto a volatile memory, process the command or the data stored in the volatile memory, and store resulting data in a non-volatile memory.

According to an embodiment, the processor 120 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor and the auxiliary processor, the auxiliary processor may be configured to use lower power than the main processor or to be specified for a designated function. The auxiliary processor may be implemented separately from, or as part of, the main processor. The auxiliary processor may control at least some of functions or states related to at least one component (e.g., display module 160, sensor module 176, or communication module 190) of the electronic device 101, instead of the main processor while the main processor is in an inactive (e.g., sleep) state or along with the main processor while the main processor is an active state (e.g., executing an application). According to an embodiment, the auxiliary processor (e.g., an image signal processor or a communication processor) may be implemented as part of another component (e.g., the camera module 180 or the communication module 190) functionally related to the auxiliary processor 123. According to an embodiment, the auxiliary processor (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

According to an embodiment, the memory 130 may store various data used by at least one component (e.g., the processor 120 or a sensor module 176) of the electronic device 101. The various data may include, for example, software (e.g., the program 140) and input data or output data for a command related thereto. The memory 130 may include a volatile memory or a non-volatile memory.

According to an embodiment, the program 140 may be stored in the memory 130 as software, and may include, for example, an operating system (OS) 142, middleware 144, or an application 146.

According to an embodiment, the input module 150 may receive a command or data to be used by other component (e.g., the processor 120) of the electronic device 101, from the outside (e.g., a user) of the electronic device 101. The input module 150 may include, but is not limited to, a microphone, a button, and/or a touch pad.

According to an embodiment, the sound output module 155 may output sound signals to the outside of the electronic device 101. The sound output module 155 may include, e.g., a speaker. The speaker may be used for general purposes, such as playing multimedia or playing record.

According to an embodiment, the display module 160 may visually provide information to the outside (e.g., the user) of the electronic device 101. For example, when the electronic device 101 is implemented as AR glasses, the display module 160 may include, but is not limited thereto, a liquid crystal display (LCD), a digital mirror device (DMD), a liquid crystal on silicon (LCoS), light emitting diode (LED) on silicon (LEDoS), organic light emitting diode (OLED), or micro light emitting diode (micro LED). The display module 160 may have different implementation forms depending on the type of electronic device 101.

According to an embodiment, the audio module 170 may convert a sound into an electrical signal and vice versa. According to an embodiment, the audio module 170 may obtain the sound via the input module 150, or output the sound via the sound output module 155 or a headphone of an external electronic device (e.g., external electronic device 102) directly (e.g., wiredly) or wirelessly coupled with the electronic device 101. The external electronic device 102 may be, e.g., a mobile device, such as a smart phone or tablet PC, but is not limited thereto.

According to an embodiment, the sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, and/or an illuminance sensor.

According to an embodiment, the interface 177 may support one or more specified protocols to be used for the electronic device 101 to be coupled with the external electronic device (e.g., external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

According to an embodiment, the connecting terminal 178 may include a connector via which the electronic device 101 may be physically connected with the external electronic device (e.g., external electronic device 102). According to an embodiment, the connecting terminal 178 may include, for example, a HDMI connector, a USB connector, a SD card connector, or an audio connector (e.g., a headphone connector).

According to an embodiment, the haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

According to an embodiment, the camera module 180 may capture a still image and a video. According to an embodiment, the camera module 180 may include one or more lenses, image sensors, image signal processors, or flashes.

According to an embodiment, the power management module and/or battery 189 may manage power supplied to the first external electronic device 101. According to an embodiment, the power management module and/or battery 189 may be implemented as at least part of, for example, a power management integrated circuit (PMIC). The power management module and/or the battery 189 may supply power to at least one component of the electronic device 101. According to an embodiment, the power supply module and/or battery 189 may include, for example, a primary cell which is not rechargeable, a secondary cell which is rechargeable, or a fuel cell.

According to an embodiment, the communication module 190 may support establishing a direct (e.g., wired) communication channel or a wireless communication channel between the electronic device 101 and the external electronic device (e.g., external electronic device 102, external electronic device 103, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device 102 or 103 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a $5^{th}$ generation (5G) network, a next-generation communication network, the Internet, or a computer network (e.g., LAN or WAN). These various types of communication modules may be implemented as a single component (e.g., a single chip), or may be implemented as multi components (e.g., multi chips) separate from each other. The wireless communication module may identify or authenticate the electronic device 101 in a communication network, such as the first network 198 or the second network 199, using subscriber information (e.g., international mobile subscriber identity (IMSI)) stored in the subscriber identification module.

The wireless communication module may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., the mmWave band) to achieve, e.g., a high data transmission rate. The wireless communication module may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module may support various requirements specified in the electronic device 101, an external electronic device (e.g., the electronic device 103), or a network system (e.g., the second network 199). According to an embodiment, the wireless communication module may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. As described above, when the electronic device 101 supports cellular communication, such as 4G and 5G, the electronic device 101 may be referred to as a standalone (SA) type electronic device. Meanwhile, the electronic device 101 may be implemented not to support cellular communication, such as $4^{th}$ generation (4G) and 5G. In this case, the electronic device 101 may use the Internet via the external electronic device 102 supporting cellular communication using the first network 198 in which case the electronic device 101 may be referred to as a non-standalone type electronic device.

According to an embodiment, the antenna module 197 may transmit or receive a signal or power to or from the outside (e.g., the external electronic device). According to an embodiment, the antenna module 197 may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 102 or 103 via the server 108 coupled with the second network 199. The external electronic devices 102 and 103 each may be a device of the same or a different type from the electronic device 101. According to an embodiment, all or some of operations to be executed at the electronic device 101 may be executed at one or more of the external electronic devices (external electronic devices 102 and 103 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 103 may include an Internet-of-things (IoT) device. The server 108 may be an intelligent server using machine learning and/or a neural network. According to an embodiment, the external electronic device 103 or the server 108 may be included in the second network 199. The electronic device 101 may be applied to intelligent services (e.g., smart home, smart city, smart car, or health-care) based on 5G communication technology or IoT-related technology.

Figure 2:
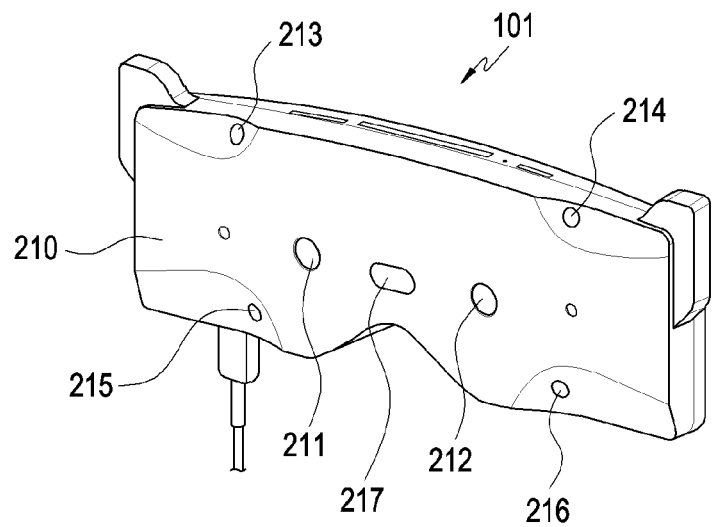
FIG. 2 is a diagram illustrating an electronic device according to an embodiment.

FIG. 2 is a diagram illustrating an electronic device 101 according to an embodiment.

Figure 3:
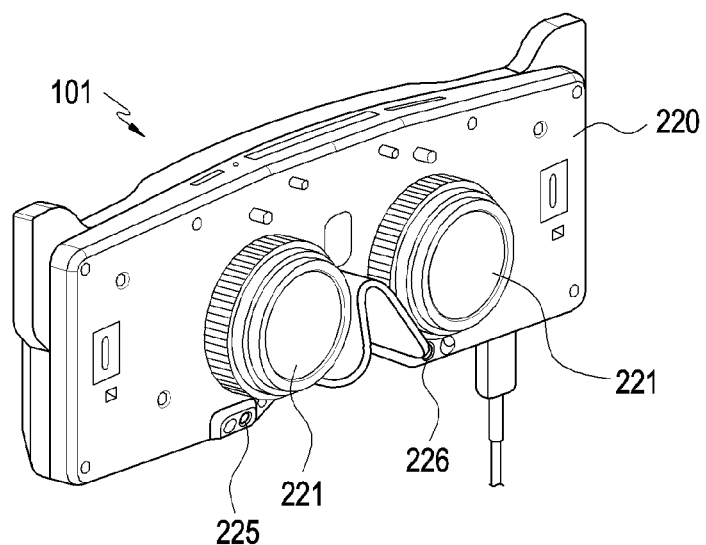
FIG. 3 is a diagram illustrating an electronic device according to an embodiment.

FIG. 3 is a diagram illustrating an electronic device 101 according to an embodiment.

Referring to FIGS. 2 and 3, in an embodiment, video see through (VST) camera modules 211 and 212 for VST, a plurality of camera modules 213, 214, 215, and 216, a depth sensor 217, and/or a second display 230 may be disposed on the first surface 210 of the housing. For example, the VST camera modules 211 and 212, the plurality of camera modules 213, 214, 215, and 216, the depth sensor 217, and/or the second display 230 may be exposed through an opening formed in the first surface 210 of the housing.

In an embodiment, the VST camera modules 211 and 212 may obtain images related to the ambient environment of the electronic device. The images obtained by the VST camera modules 211 and 212 may be provided, as at least a portion of VST content, to the user.

In an embodiment, the plurality of camera modules 213, 214, 215, and 216 may obtain images while the electronic device is worn by the user. The images obtained through the plurality of camera modules 213, 214, 215, and 216 may be used for simultaneous localization and mapping (SLAM), 6 degrees of freedom (6DoF), subject recognition, and/or tracking. In an embodiment, the depth sensor 217 may be used for identifying the distance to the object, such as time of flight (TOF). Alternatively or additionally to the depth sensor 217, the plurality of camera modules 213, 214, 215, and 216 may identify the distance to the object.

According to an embodiment, camera modules 215 and 216 for face recognition and/or a display 221 (and/or lens) may be disposed on the second surface 220 of the housing.

In an embodiment, the camera modules 225 and 226 for face recognition may be used for recognizing the user's face.

In an embodiment, the display 221 (and/or lens) may be disposed on the second surface 220 of the electronic device 101 facing the face when the electronic device 101 is worn on the user's face. In an embodiment, the display 221 (and/or lens) may display a screen including various information while the electronic device 101 is worn by the user.

In an embodiment, the electronic device 101 may further include one or more components. For example, the electronic device 101 may further include a proximity sensor, a touch sensor, and/or a pressure sensor for detecting that the electronic device is worn on the user (e.g., the user's face). For example, the electronic device 101 may further include a fingerprint sensor (an optical or ultrasonic fingerprint sensor). For example, the electronic device 101 may further include at least one key (or button).

In an embodiment, the electronic device 101 may omit some of the components shown in FIGS. 2 and 3. For example, the electronic device 101 may not include the camera modules 215 and 216 among the plurality of camera modules 213, 214, 215 and 216.

In an embodiment, the electronic device 101 may further include at least one of the components of the electronic device 101 shown in FIG. 1.

In an embodiment, FIGS. 2 and 3 illustrate the electronic device 101 using the VST scheme, but the disclosure is not limited thereto. For example, the operation of controlling VR content to be described below may be applied to all wearable electronic devices capable of providing VR content. For example, the operation of controlling VR content to be described below may be applied to a VR electronic device that does not include the VST camera modules 211 and 212 for VST.

Figure 4:
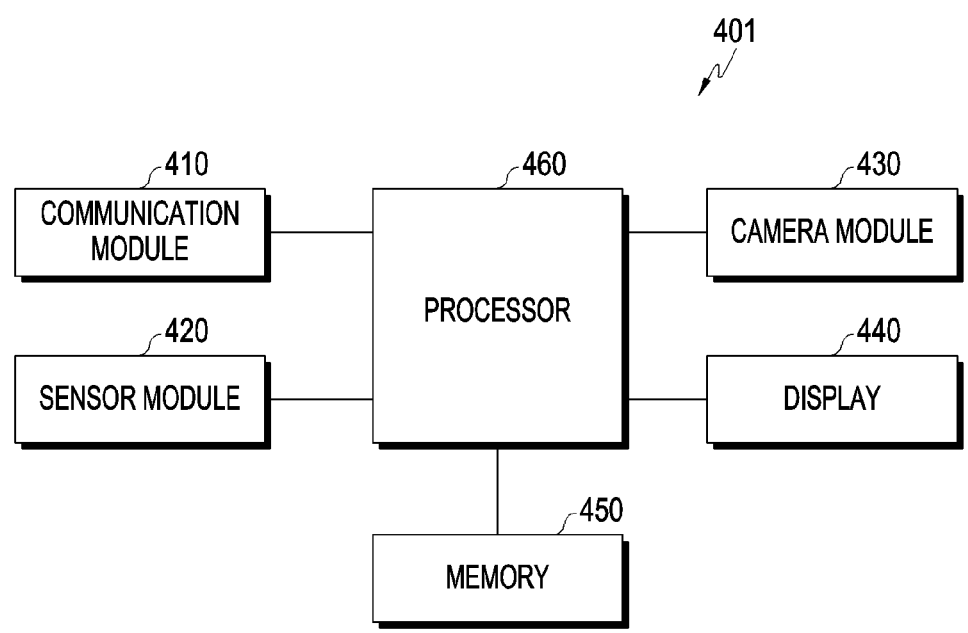
FIG. 4 is a block diagram illustrating an electronic device according to an embodiment.

FIG. 4 is a block diagram illustrating an electronic device 401 according to an embodiment.

Referring to FIG. 4, in an embodiment, the electronic device 401 may include a communication module 410, a sensor module 420, a camera module 430, a display 440, a memory 450, and/or a processor 460.

In an embodiment, the communication module 410 may be included in the communication module 190 of FIG. 1.

In an embodiment, the communication module 410 may be used to obtain input using the user's motion. For example, a controller wirelessly (or wiredly) connected to the electronic device 401 may include a motion sensor (e.g., an inertia measurement unit (IMU) sensor). When the controller is moved by the user's motion while being gripped by the user (e.g., the user's hand), information about the motion of the controller may be obtained through the motion sensor. The communication module 410 may obtain input using the user's motion by receiving information about the motion of the controller obtained by the controller from the controller. For example, the communication module 410 may receive information about the input obtained from the controller (e.g., a joystick, a keyboard, and a mouse) from the controller.

In an embodiment, the sensor module 420 may be included in the sensor module 176 of FIG. 1.

In an embodiment, the sensor module 420 may obtain motion of the electronic device 401. For example, the sensor module 420 may include a motion sensor (e.g., a sensor supporting 6 degrees of freedom (6DoF)). The sensor module 420 may obtain the motion of the electronic device 401 made by a motion of the user wearing the electronic device 401 (e.g., the user's head) through the motion sensor.

In an embodiment, the camera module 430 may be included in the camera module 180 of FIG. 1.

In an embodiment, the camera module 430 may be used to obtain input to the electronic device 401. For example, the camera module 430 may obtain images of the user's body, such as the user's eyes and hands. The input by the user's body may be obtained using the images obtained through the camera module 430.

In an embodiment, the camera module 430 may obtain an image of the ambient environment of the electronic device 401 (e.g., the electronic device 401 worn by the user). The obtained ambient environment image may be used to set (e.g., adjust) a safe zone to be described below.

In an embodiment, the display 440 may be included in the display module 160 of FIG. 1 and/or the display 221 of FIG. 3.

According to an embodiment, the memory 450 may be included in the memory 130 of FIG. 1.

In an embodiment, the memory 450 may store information for performing the operation of controlling VR content. Information stored in the memory 450 is described below.

According to an embodiment, the processor 460 may be included in the processor 120 of FIG. 1.

In an embodiment, the processor 460 may control the overall operation of controlling VR content. The processor 460 may include one or more processors for controlling the operation of controlling VR content. The processor 460 may include a plurality of modules to perform the operation of controlling VR content. The plurality of modules included in the processor 460 are described with reference to FIG. 5.

The electronic device 401 is illustrated as including the communication module 410, the sensor module 420, the camera module 430, the display 440, the memory 450, and the processor 460 in FIG. 4, but is not limited thereto. For example, the electronic device 401 may not include some of the components shown in FIG. 4. For example, the electronic device 401 may further include some of the components of the electronic device 101 shown in FIG. 1.

Figure 5:
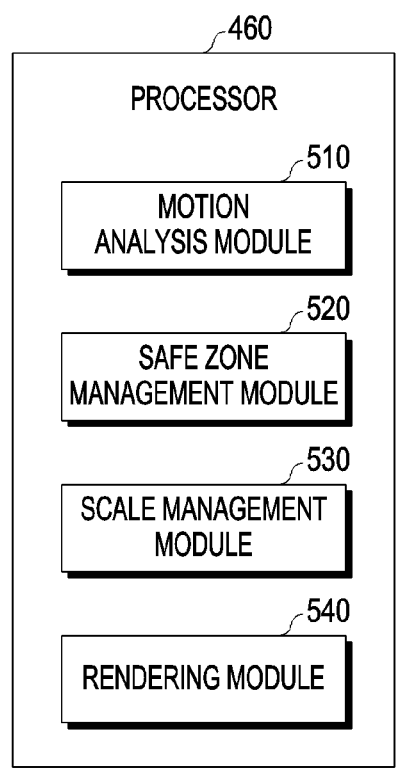
FIG. 5 is a block diagram illustrating a processor according to an embodiment.

FIG. 5 is a block diagram illustrating a processor 460 according to an embodiment.

Referring to FIG. 5, in an embodiment, the processor 460 may include a motion analysis module 510, a safe zone management module 520, a scale management module 530, and/or a rendering module 540.

In an embodiment, the motion analysis module 510 may generate data for an avatar's motion to be performed in a virtual space of VR content based on an input using the user's motion.

In an embodiment, the motion analysis module 510 may obtain an input using the user's motion, such as the motion of the controller by the user's motion (e.g., the motion of the hand gripping the controller) received through the communication module 410 from the controller, the user's motion obtained based on the image obtained through the camera module 430, and/or the motion of the electronic device 401 by the user's motion (e.g., the motion of the user's head) obtained through the sensor module 420.

In an embodiment, the motion analysis module 510 may generate data (also referred to as "avatar's pose data") that allows the motion of the avatar (also referred to as a "character") (e.g., an avatar corresponding to the user) to be performed in the virtual space of the VR content, based on the obtained input using the user's motion. For example, when the user makes a motion of swinging a tennis racket using the controller while a tennis game performed in the virtual space is running on the electronic device 401, the motion analysis module 510 may generate data to allow the avatar corresponding to the user in the virtual space of the tennis game to perform the motion of swinging a virtual racket corresponding to the user's motion of swinging the racket.

In an embodiment, the avatar's motion corresponding to the user's motion may include a motion that the avatar performs identically to the user's actual motion. However, the disclosure is not limited thereto. For example, when the user performs motions that are partially different (e.g., the user's motion of putting her hand on head and the user's motion of raising her hand over head), the motion analysis module 510 may generate data to allow the same avatar motion (e.g., the avatar's motion of raising its hand over head) to be performed.

In the above-described example, the avatar corresponding to the user performs a motion based on the input using the user's motion, but the disclosure is not limited thereto. For example, the motion analysis module 510 may generate data for controlling the object (e.g., move or display the object) displayed in the virtual space of the VR content, as well as the avatar corresponding to the user, based on an input using the user's motion.

In an embodiment, the safe zone management module 520 may manage a space where the user may safely receive VR content (hereinafter referred to as a "safe zone").

In an embodiment, the safe zone may be a space (e.g., a space free of obstacles to prevent user injury) where the user wearing the electronic device 401 is safely provided with VR content.

In an embodiment, the safe zone management module 520 may set a safe zone. For example, the safe zone management module 520 may set a safe zone based on the user input for setting the safe zone. For example, the safe space management module 520 may obtain information about the external environment around the user (or electronic device 401) using the camera module 430 and/or the sensor module 420 (e.g., depth sensor 217). The safe zone management module 520 may set a safe zone based on the obtained information about the external environment. The operation of setting the safe zone by the safe zone management module 520 is described below in detail.

In an embodiment, when a safe zone is set, the safe zone management module 520 may store information about the set safe zone in the memory 450. The safe zone management module 520 may provide information about the set safe zone to the scale management module 530.

In an embodiment, the scale management module 530 may set (e.g., adjust) a scale value for determining the size of the avatar's motion performed by the user's motion, based on the space required for the user's motion corresponding to the avatar (hereinafter referred to as "first space") and the safe zone (hereinafter referred to as "second space").

In an embodiment, the first space may be a space required to perform user motions that allow the user to perform motions of an avatar that may be performed in the virtual space of VR content.

In an embodiment, the scale management module 530 may obtain (e.g., create) the first space. The operation of the scale management module 530 to obtain the first space is described below in detail. In the above-described example, the scale management module 530 is described as obtaining the first space, but the disclosure is not limited thereto. For example, the motion analysis module 510 may obtain (e.g., create) the first space instead of the scale management module 530. In this case, the motion analysis module 510 may provide the obtained information about the first space to the scale management module 530.

In an embodiment, the scale management module 530 compares the first space and the second space to determine a scale value for determining the size of the avatar motion performed by the user's motion (hereinafter referred to as a "scale value").

In an embodiment, the scale value may include a value capable of controlling (e.g., rendering) the size of the motion of the avatar to differ with respect to the motion of the user having the same size.

In an embodiment, the scale value may be a value used together with the size of the user's motion to determine the size of the avatar's motion.

In an embodiment, the scale value is a scale factor representing the relationship between the size of the user's motion and the size of the avatar's motion corresponding to the user's motion (or a coefficient representing the relationship between the size of the user's motion and the size of the avatar's motion).

In an embodiment, the scale value may be a value for scaling (e.g., increasing or decreasing) the user's motion (e.g., coordinates representing the user's motion). For example, the scale value may be a value for increasing the distance between a plurality of points measured while the user's motion is continuously performed, including the point at which the user's motion starts (e.g., when at least a portion of the first space is present outside the second space) or reducing (or maintaining) the distance (e.g., when the entire first space is present inside the second space).

In an embodiment, as the scale value as set increases, the size of the avatar motion performed by the user motion having the same size may increase. For example, when the scale value is set to a first value, and an input using the user's motion of moving by a first distance (e.g., 1 meter (m) in the real space) is entered, the scale management module 530 may allow the avatar to move by a second distance in the virtual space (e.g., 1 m in the virtual space). Even when the scale value is set to a second value higher than the first value, and an input using the user's motion of moving by a third distance (e.g., 0.5 m in the real space) shorter than the first distance is entered, the scale management module 530 may allow the avatar to move by the second distance in the virtual space (e.g., 1 m in the virtual space).

In an embodiment, the scale management module 530 may compare the first space and the second space to identify whether at least a portion of the first space is outside the second space. The scale management module 530 may adjust or maintain the scale value based on whether at least a portion of the first space is present outside the second space. A more detailed example of setting the scale value by comparing the first space and the second space by the scale management module 530 is described below in detail.

In an embodiment, the rendering module 540 may render (e.g., represent) an avatar performing the motion corresponding to the user's motion in a virtual space. For example, the rendering module 540 may perform a rendering operation so that the avatar whose motion size is determined based on the scale value is displayed through the display 440.

In FIG. 5, the motion analysis module 510, the safe zone management module 520, the scale management module 530, and the rendering module 540 are illustrated as independent modules, but are not limited thereto. For example, at least two modules of the motion analysis module 510, the safe zone management module 520, the scale management module 530, and the rendering module 540 may be implemented as one integrated module.

In FIG. 5, an example in which the processor 460 includes the motion analysis module 510, the safe zone management module 520, the scale management module 530, and the rendering module 540 is illustrated, but the disclosure is not limited thereto. For example, the processor 460 may further include an additional module to perform the operation of controlling VR content.

According to an embodiment, the wearable electronic device 401 may include a display 440 and at least one processor 460 (also referred to herein as "processor 460"). At least one processor 460 may be configured to obtain a first space necessary for a motion of a user corresponding to a motion of an avatar, the motion of the avatar being performed in a virtual space of virtual reality (VR) content displayed through the display (440). At least one processor 460 may be configured to obtain a second space for safely performing the motion of the user. At least one processor 460 may be configured to set a scale value, based on the first space and the second space. At least one processor 460 may be configured to, based on obtaining the motion of the user, determine, using the set scale value, a size of the motion of the avatar, the motion of the avatar being performed by the motion of the user.

In an embodiment, the at least one processor 460 may be configured to at least one avatar motion performable in the VR content and obtain the first space, based on the at least one avatar motion.

In an embodiment, the at least one processor 460 may be configured to obtain at least one space necessary for the user to perform the at least one avatar motion, respectively, and set a space formed by the at least one space as the first space.

In an embodiment, the at least one processor 460 may be configured to obtain the first space at the time of executing the VR content, the time when the virtual space is changed in the VR content, the time when a specific scene is changed in the VR content, the time when a specific stage is changed in the VR content, and/or the time when a specific scenario is changed in the VR content.

In an embodiment, the at least one processor 460 may be configured to obtain the second space based on an input of the user or the ambient environment of the wearable electronic device 401.

In an embodiment, the scale value comprises a scale factor indicating a relationship between a size of the motion of the user and the size of the motion of the avatar, and as the scale value increases, the size of the motion of the avatar performed by the motion of the user having a same size increases.

In an embodiment, the at least one processor 460 may be configured to compare the first space and the second space, identify whether a portion of the first space is present outside the second space, and based on identifying that the portion of the first space is present outside the second space, set the first scale value larger than a designated scale value for the VR content, as the scale value.

In an embodiment, the at least one processor 460 may be configured to set the first scale value at which a third space corresponding to the first scale value is identical to the second space or is present in the second space, as the scale value, based on identifying that a portion of the first space is present outside the second space.

In an embodiment, the at least one processor 460 may be configured to display an intro screen through the display 440 to allow the user to adapt to the set scale value.

In an embodiment, the at least one processor 460 may be configured to place an object to be rendered in the VR content based on the second space.

Figure 6:
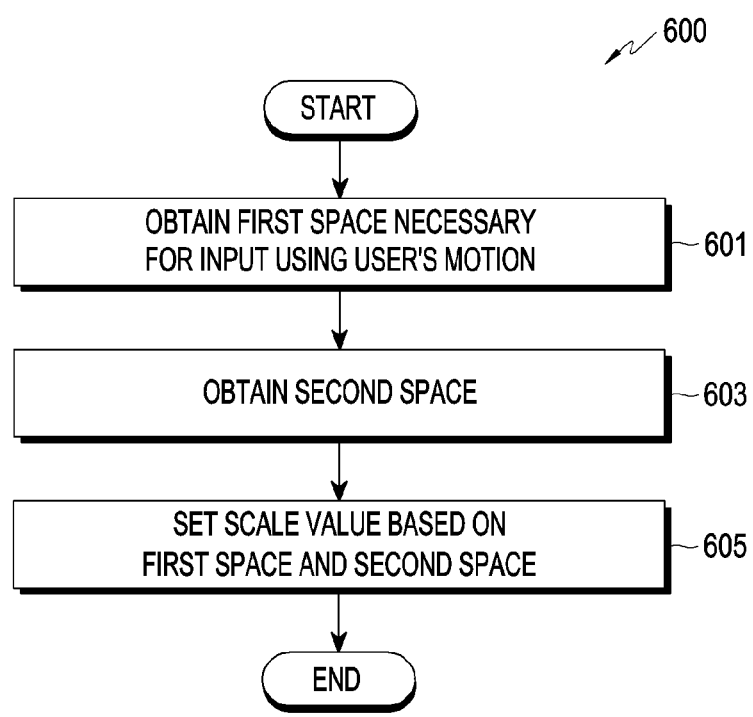
FIG. 6 is a flowchart illustrating a method for controlling virtual reality (VR) content according to an embodiment.

FIG. 6 is a flowchart 600 illustrating a method for controlling VR content, according to an embodiment.

Referring to FIG. 6, in operation 601, in an embodiment, the processor 460 may obtain a first space required for the user's motion corresponding to an avatar's motion performed in the virtual space of the VR content.

In an embodiment, the avatar's motion corresponding to the user's motion may include a motion that the avatar performs identically to the user's actual motion. Hereinafter, with reference to FIG. 7, the avatar's motion corresponding to the user's motion is described.

Figure 7:
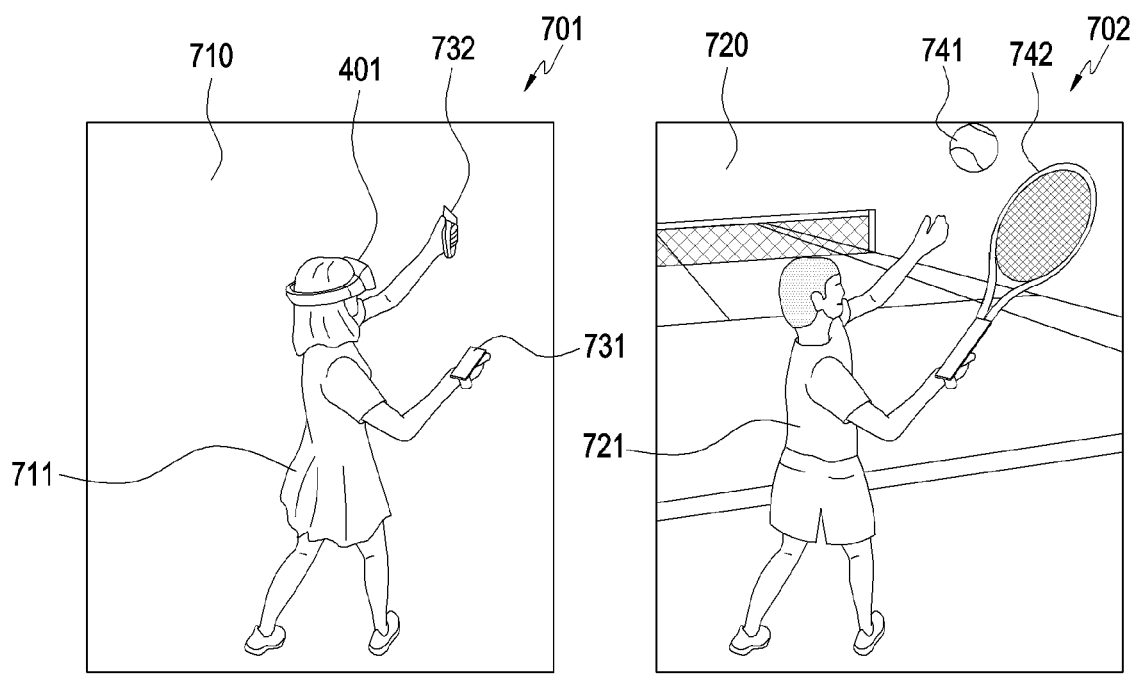
FIG. 7 illustrates an example of avatar motion corresponding to a user's motion according to an embodiment.

FIG. 7 illustrates an example of avatar motion corresponding to a user's motion according to an embodiment.

Referring to FIG. 7, in an embodiment, reference numeral 701 may depict the motion of the user 711 performed on the real space 710 while VR content is provided. Reference numeral 702 may depict the motion of the avatar 721 corresponding to the user 711 performed in the virtual space 720 while VR content (e.g., tennis game) is provided.

In an embodiment, when the user 711 inputs a serve motion (e.g., tennis serve motion) using the controller 731 (and the controller 732) as shown in 701, the avatar 721 may perform substantially the same serve motion as the serve motion of the user 711 as shown in 702. For example, in 701, the angle and/or strength (or acceleration) of the arm of the user 711 gripping the controller 731 may be substrate the same as the angle and/or strength (or acceleration) of the arm of the avatar 721 in 702. In an embodiment, as shown in 702, a virtual ball 701 and a virtual tennis racket 742 may be displayed in the virtual space. An example in which the user's motion and the avatar's motion are substantially the same has been described in connection with FIG. 7, but the disclosure is not limited thereto. For example, the avatar's motion corresponding to the user's motion may include the motion performed identically by the avatar when the user performs partially different motions.

In an embodiment, the first space required for the user's motion corresponding to the avatar's motion may include a space necessary for performing user motions that allow the user to perform avatar motions that may be performed in the virtual space of the VR content. The first space and the operation of the processor 460 to obtain the first space are described below in more detail with reference to FIG. 8.

Figure 8:
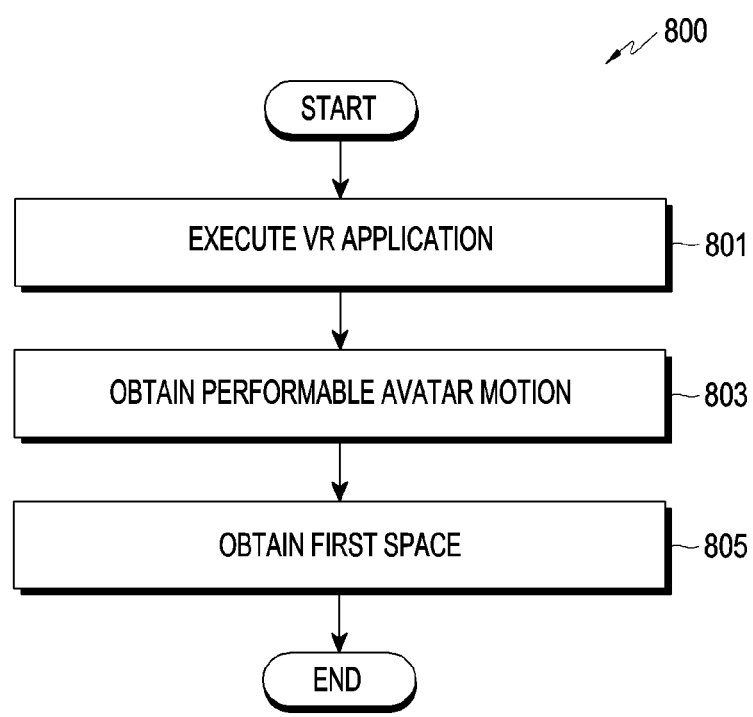
FIG. 8 is a flowchart illustrating a method for obtaining a first space according to an embodiment.

FIG. 8 is a flowchart 800 illustrating a method for obtaining the first space, according to an embodiment.

Referring to FIG. 8, in operation 801, in an embodiment, the processor 460 may execute a VR application. For example, the processor 460 may execute the VR application based on a user input.

In an embodiment, the VR application may include a game application and a video application capable of providing VR content represented in a virtual space of a virtual environment (or also referred to as "virtual world"). However, the VR application is not limited to the above-described game application and video application.

In an embodiment, the VR content may include content capable of controlling the avatar's motion by the user's motion. The VR content may include content capable of representing a scene from a first-person view or a third-person view corresponding to the direction in which the electronic device 401 faces (or the user's line of sight).

In an embodiment, the processor 460 may render (e.g., represent) a specific virtual space, a specific scene, a specific stage, or a specific scenario in the VR content as the VR application is executed.

In operation 803, in an embodiment, the processor 460 may obtain the avatar's motion that may be performed in the VR content.

In an embodiment, the processor 460 may obtain motions that the avatar may perform (e.g., a list of motions that the avatar may perform) in the VR content (or VR application). For example, when the VR content is a tennis game, the processor 460 may obtain the motion of the avatar swinging a virtual racket (e.g., a serve motion, a forehand motion, and a backhand motion) and the motion of the avatar to move, which the avatar may perform in the tennis game. In the above-described example, all motions that the avatar may perform in VR content (or VR applications) may be obtained, such as all motions that the avatar may perform in a tennis game, but the disclosure is not limited thereto. In an embodiment, when representing a specific virtual space, a specific scene, a specific stage, or a specific scenario in VR content, the processor 460 may obtain motions that the avatar may perform in the specific virtual space, specific scene, specific stage, or specific scenario. For example, first motions that the avatar may perform in a first virtual space of VR content and second motions that the avatar may perform in a second virtual space different from the first virtual space of VR content may include different motions. In this case, the processor 460 may obtain the first motions when the avatar enters the first virtual space and obtain the second motions when the avatar enters the second virtual space.

In operation 805, in an embodiment, the processor 460 may obtain a first space based on the avatar's motion that may be performed.

In an embodiment, the first space may include a space necessary for performing user motions to perform avatar motions that may be performed in the VR content (or specific virtual space, specific scene, specific stage, or specific scenario of the VR content) (hereinafter, referred to as "performable avatar motions").

In an embodiment, the first space may be a space set based on a scale value designated in the VR content (or specific virtual space, specific scene, specific stage, or specific scenario of the VR content) and performable avatar motions.

In an embodiment, the processor 460 may set (e.g., adjust) the first space based on the scale value designated in the VR content (e.g., a scale value set as default in the VR content) and performable avatar motions.

In an embodiment, the scale value set as default in the VR content (hereinafter, referred to as "default scale value") may be a scale value at which the size of the user motion performed in the real space is identical to the size of the avatar motion performed in the virtual space by the user motion having the size. For example, the scale value set as default in the VR content may be a scale value that allows the avatar to move a distance of 1 m set in the virtual space when the user moves a distance of 1 m in the real space. For example, the scale value designated in the VR content may be a scale value that allows the avatar to rotate the avatar's arm by 30 degrees in the virtual space when the user rotates the user's arm by 30 degrees in the real space.

In an embodiment, the processor 460 may calculate each of the avatar motions capable of performing the scale value set as default of the VR content, thereby obtaining a plurality of spaces (hereinafter, referred to as "a plurality of first sub spaces") necessary to perform each of the performable avatar motions.

In an embodiment, the processor 460 may set a space formed by a plurality of first sub spaces as the first space with respect to the user's position in the real space. For example, the processor 460 may set a space corresponding to a union of the plurality of first sub spaces as the first space with respect to the user's position in the real space.

In the above-described examples, it is illustrated that the first space is set based on the user's motion corresponding to the avatar's motion, but the disclosure is not limited thereto. For example, the processor 460 may set the first space considering the user's motion and the size of the controller gripped by the user. The controller capable of controlling VR content may come in various sizes. The processor 460 may set the first space considering the user's motion and the size of the controller gripped by the user.

In the above-described examples, it is illustrated that the first space is set based on the user's motion corresponding to the avatar's motion, but the disclosure is not limited thereto. For example, the processor 460 may set the first space by considering a margin space (or extra space) in addition to the space required for the user's motion. For example, when the space required for the user's motion is a sphere with a radius of 2 m, the processor 460 may set a first space shaped as a sphere with a radius of 2.5 m which includes a margin space (or extra space) in addition to the space required for the user's motion.

In an embodiment, the processor 460 may set the first space based on the user's motion and the controller type. For example, when a first type of controller such as a joystick, keyboard, or mouse is used, the processor 460 may set a space having a smaller size than the first space set when a second type of controller including a 6 DoF sensor is used, as the space necessary for the user motion.

In the above-described examples, as the scale value designated in the VR content, the scale value set as default of the VR content is described, but the disclosure is not limited thereto. For example, the processor 460 may designate a scale value different from the default scale value as a scale value to be used to set the first space, based on a user input.

Referring back to FIG. 6, in operation 603, in an embodiment, the processor 460 may obtain a second space (safe zone) for the user to safely perform the user's motion.

In an embodiment, the processor 460 may set the second space based on a user input. An operation for setting a second space based on a user input is described below with reference to FIG. 9.

Figure 9:
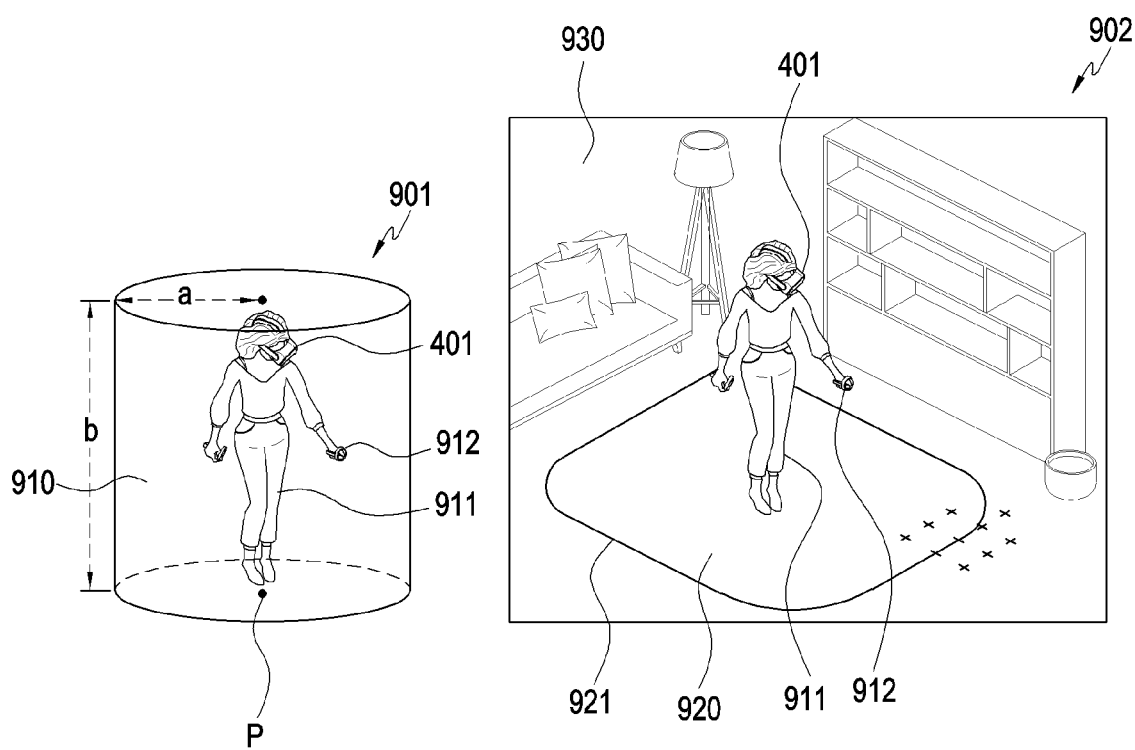
FIG. 9 is illustrates an example method for setting a second space according to an embodiment.

FIG. 9 illustrates an example method for setting a second space according to an embodiment.

Referring to FIG. 9, in an embodiment, the processor 460 may set a second space formed by a distance set by a user input based on the user's position. For example, at reference numeral 901, the processor 460 may obtain a user input for setting a distance spaced apart from the user's position P. The processor 460 may set the second space 910 shaped as a cylinder with a radius of a on the top and bottom surfaces with respect to the user's position P based on the obtained user input. In 901, the height b of the second space 910 may be set to be equal to the position of the electronic device 401 (e.g., the height from the bottom surface of the real space to the position of the electronic device 401) or be set to the sum of a margin height (e.g., extra height) and the position of the electronic device 401. In 901, the shape of the second space 910 is illustrated as being a cylinder, but is not limited thereto. For example, the processor 460 may set the second space in various shapes (e.g., rectangular parallelepiped) based on the distance set by the user input with respect to the user's position P.

In an embodiment, the processor 460 may set the formed second space based on an area designated by a user input. For example, at reference numeral 902, the processor 460 may obtain an input for drawing a line 921 (e.g., a set of points where a line formed in a direction in which the controller 912 faces from the position of the controller 912 and the bottom surface of the real space 930 intersect) by the user 911 gripping the controller 912 in the real space 930 by using the controller 912. The processor 460 may obtain the area 920 formed by the line 921 (e.g., bordered by the line 921) based on the obtained input. The processor 460 may set a space having a designated height (e.g., the height obtained by adding the margin height to the height from the bottom surface of the actual space to the position of the electronic device 401) with respect to the area 920 as the second space.

FIG. 9 illustrates an operation for setting a second space based on a user input, but the disclosure is not limited thereto. For example, the processor 460 may obtain information about the ambient environment of the electronic device 401 using the camera module 430 and/or the sensor module 420 (e.g., the depth sensor 217). The processor 460 may obtain (e.g., set) a space free of obstacles for the user as the second space, based on the information about the ambient environment of the electronic device 401. In an embodiment, the processor 460 may sets a uniform space, such as the second space 910 of reference numeral 901, as the second space, or set a non-uniform space as the second space.

Referring back to FIG. 6, in operation 605, in an embodiment, the processor 460 may set a scale value for determining the size of the avatar motion performed by the user's motion, based on the first space and the second space. In an embodiment, the processor 460 may determine, using the set scale value, a size of the motion of the avatar, the motion of the avatar being performed by the motion of the user, based on obtaining the motion of the user. For example, if the motion of the user is obtained after the scale value is set, the processor 460 may determine, by applying the set scale value to the motion of the user, the size of the motion of the avatar.

In an embodiment, the scale value may be a value used together with the size of the user's motion to determine the size of the avatar's motion.

In an embodiment, the scale value is a scale factor representing the relationship between the size of the user's motion and the size of the avatar's motion corresponding to the user's motion (or a coefficient representing the relationship between the size of the user's motion and the size of the avatar's motion).

In an embodiment, the scale value may be a value for scaling (e.g., increasing or decreasing) the user's motion (e.g., coordinates representing the user's motion). For example, the scale value may be a value for increasing the distance between a plurality of points measured while the user's motion is continuously performed, including the point at which the user's motion starts (e.g., when at least a portion of the first space is present outside the second space) or reducing (or maintaining) the distance (e.g., when the entire first space is present inside the second space).

In an embodiment, as the scale value as set increases, the size of the avatar motion performed by the user motion having the same size may increase. For example, when the scale value is set to a first value, and an input using the user's motion of moving by a first distance (e.g., 1 m) in the real space) is entered, the processor 460 may allow the avatar to move by a second distance in the virtual space (e.g., 1 m in the virtual space). Even when the scale value is set to a second value higher than the first value, and an input using the user's motion of moving by a third distance (e.g., 0.5 m in the real space) shorter than the first distance is entered, the processor 460 may allow the avatar to move by the second distance in the virtual space (e.g., 1 m in the virtual space).

Figure 10:
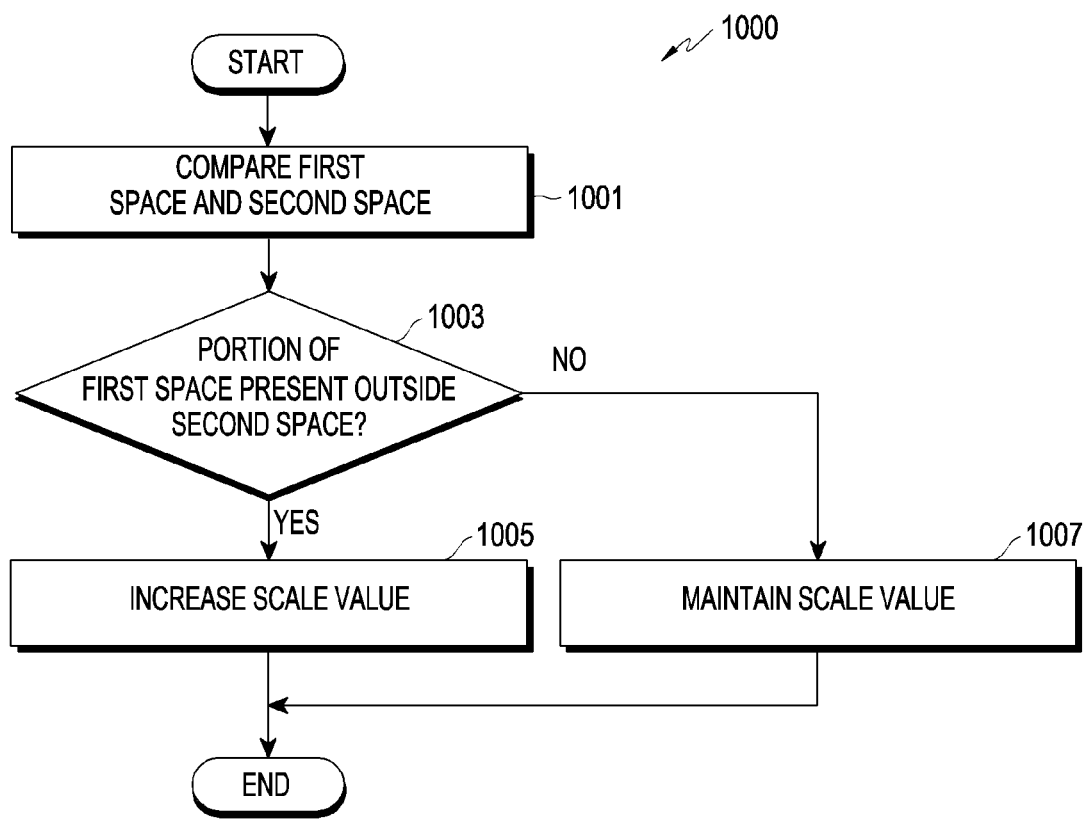
FIG. 10 is a flowchart illustrating a method for setting a scale value based on a first space and a second space according to an embodiment.

Referring to FIG. 10, an operation for setting a scale value based on the first space and the second space is described.

FIG. 10 is a flowchart 1000 illustrating a method for setting a scale value based on a first space and a second space according to an embodiment.

Referring to FIG. 10, in operation 1001, in an embodiment, the at least one processor 460 may compare the first space and the second space.

In an embodiment, the processor 460 may identify whether a portion of the first space is present outside the second space. For example, the processor 460 may identify whether a space present inside the space corresponding to the outside of the second space is present inside the first space. When a portion of the first space is present outside the second space, the user's body part may escape to the outside of the second space (safe zone) due to the user's motion while the user controls the VR content. In this case, there is a possibility that the user may collide with an obstacle disposed outside the second space. In contrast, when the entirety of the first space is present inside the second space (or when the first space and the second space are the same), the user may safely control the VR content.

In operation 1003, the processor 460 may determine whether a portion of the first space is present outside of the second space. When a portion of the first space is present outside the second space in operation 1003, the processor 460 may, in an embodiment, increase the scale value in operation 1005.

In an embodiment, when the scale value is set to a scale value larger than the default scale value, the user may allow the avatar to perform a motion using the motion performed in a space smaller than the first space. For example, when the scale value is set to the scale value m2 that is larger than the default scale value m1, the size of the user's motion required for the avatar to perform the same motion may be smaller when the scale value is set to m2 than when the scale value is set to m1. For example, the size of space required to perform the same avatar motion may be reduced as the scale value increases. Hereinafter, a space changed with respect to the first space by adjusting the scale value is referred to as a "third space".

In an embodiment, the third space may correspond to the adjusted scale value. For example, the third space may be a space set based on the adjusted scale value. For example, the third space may be a space that is changed from the first space set based on the default scale value, and is set based on the scale value adjusted by adjusting the default scale value.

In an embodiment, based on identifying that a portion of the first space is present outside the second space, the processor 460 may increase the scale value from the default scale value such that the third space (e.g., the entire space of the third space) is present inside the second space (or such that the third space is the same as the first space).

In an embodiment, based on identifying that a portion of the first space is present outside the second space, the processor 460 may increase the scale value from the default scale value such that the third space is present inside the second space and at the same time, there is a point (or surface) where the boundary surface of the third space (e.g., the surface forming the outermost surface of the third space) touches the boundary surface of the second space. For example, when the second space is formed in the shape of a cube and the third space having the same center as the second space is formed in the shape of a sphere, the processor 460 may adjust the scale value such that a sphere is present inside the cube and the boundary surface of the cube and the boundary surface of the sphere touch each other. However, the method of adjusting the scale value is not limited to the above-described example.

If a portion of the first space is not present outside the second space in operation 1003, in an embodiment, the processor 460 may maintain the scale value in operation 1007. For example, when the entirety of the first space is present inside the second space (or when the first space and the second space are the same), the processor 460 may maintain the scale value as the default scale value. However, the disclosure is not limited thereto. For example, the processor 460 may reduce the scale value such that there is a point (or surface) where the boundary surface of the third space (e.g., the surface forming the outermost surface of the third space) touches the boundary surface of the second space while the third space is present inside the second space.

In an embodiment, when the scale value is adjusted (e.g., changed), the processor 460 may display information related to the adjustment of the scale value through the display 440. For example, when the scale value is reduced, the processor 460 may display, through the display 440, information indicating that the user may control the avatar's motion by a motion of a smaller size than before.

Referring back to FIG. 6, in an embodiment, the processor 460 may perform the operation of setting a scale value through operations 601 to 605 of FIG. 6 at a time point when VR content is executed, a time point when a virtual space is changed in VR content, a time point when a specific scene is changed, a time point when a specific stage is changed, and/or a time point when a specific scenario is changed.

In an embodiment, after the scale value is set (e.g., adjusted), the processor 460 may control VR content (e.g., the avatar's motion) using the set scale value.

Figure 11:
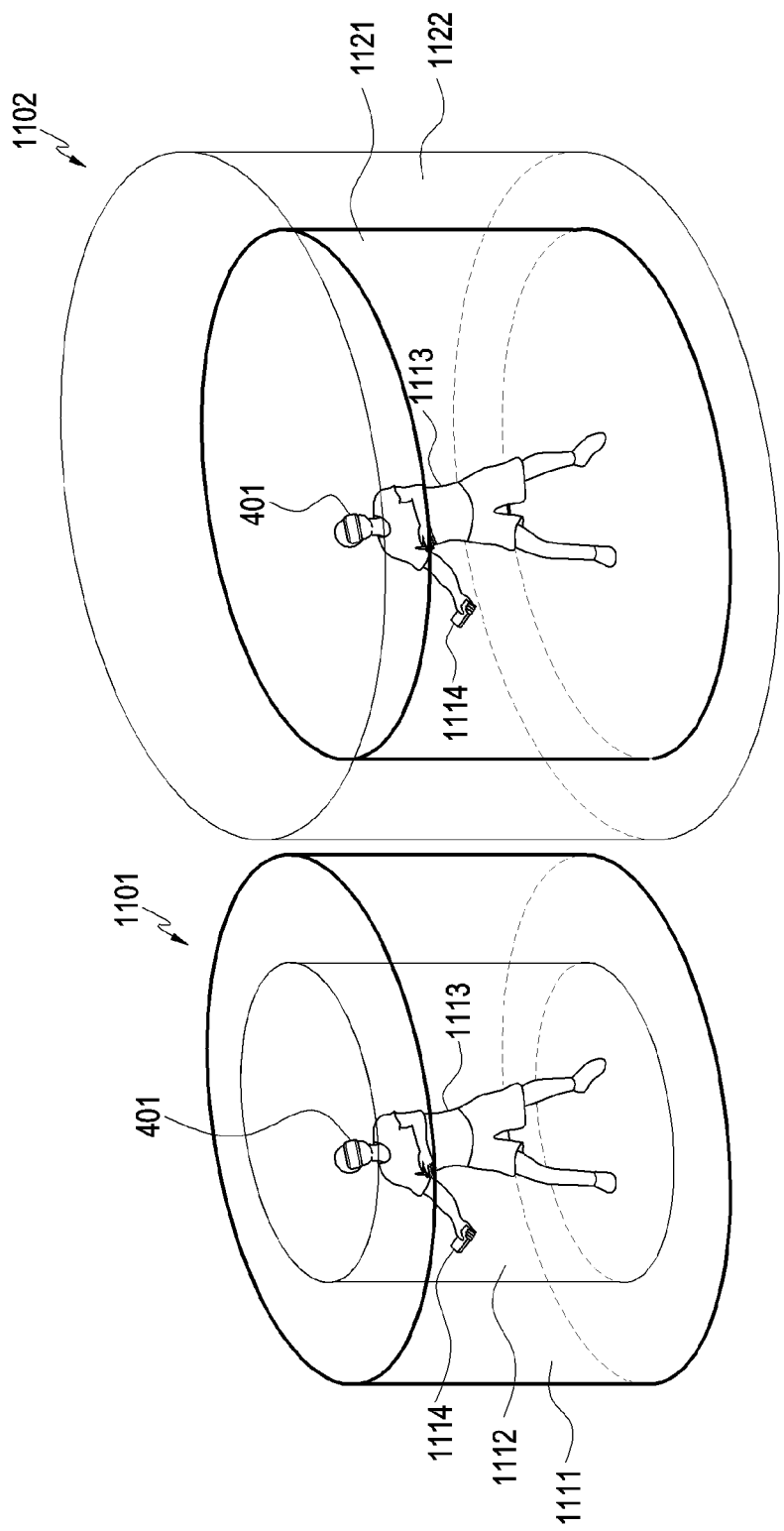
FIG. 11 illustrates an example method for setting a scale value based on a first space and a second space according to an embodiment.

FIG. 11 illustrates an example method for setting a scale value based on a first space and a second space according to an embodiment.

FIG. 11 illustrates a case in which the user 1113 executes a tennis game as VR content using the controller 1114.

In an embodiment, at reference numeral 1101, space 1111 may indicate the first space, and space 1112 may indicate the second space (safe zone). For example, in 1101, the space 1111 may indicate a first space required for the user to perform motions (e.g., a backhand swing and a forehand swing) of swinging a tennis racket by using the hand gripping the controller 1114 and movement.

In an embodiment, as illustrated in 1101, when the first space (e.g., the space 1111) is present outside the second space (e.g., the space 1112), the processor 460 may increase the scale value such that the third space changed from the first space is present inside the second space (or the third space is the same as the second space).

In an embodiment, at reference numeral 1102, space 1121 may indicate the first space, and space 1122 may indicate the second space.

In an embodiment, as illustrated in 1102, when the first space (e.g., space 1121) is present inside the second space (e.g., space 1122), the processor 460 may maintain the scale value as the default scale value.

In FIG. 11, the first space (e.g., space 1111 and space 1121) and the second space (e.g., space 1112 and space 1122) are illustrated as having a cylindrical shape, but are not limited thereto. For example, the first space and/or the second space may be set in various shapes, including a uniform space shape or a non-uniform space shape.

Figure 12:
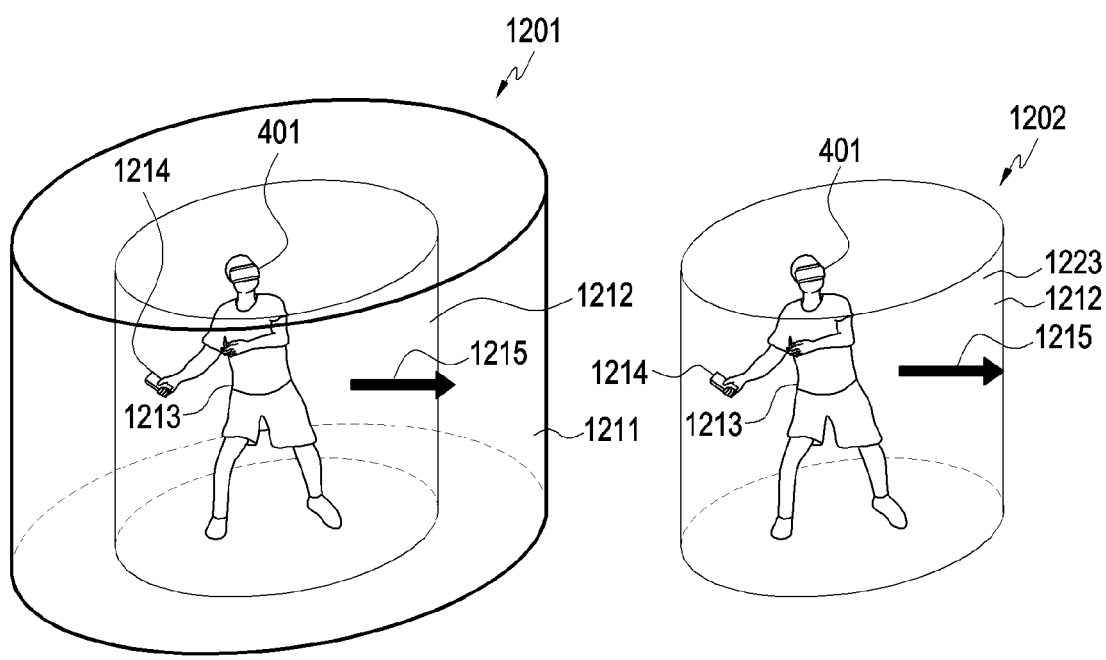
FIG. 12 illustrates an example method for setting a scale value based on a first space and a second space according to an embodiment.

FIG. 12 illustrates an example method for setting a scale value based on a first space and a second space according to an embodiment.

FIG. 12 illustrates a case in which the user 1213 executes a tennis game as VR content using the controller 1214.

In an embodiment, at reference numeral 1201, space 1211 may indicate the first space, and space 1212 may indicate the second space (safe zone). For example, in 1201, the space 1211 may indicate a first space required for the user to perform motions of swinging a tennis racket by using the hand gripping the controller 1214 and movement.

In an embodiment, as illustrated in 1201, when the first space (e.g., the space 1211) is present outside the second space (e.g., the space 1212), the processor 460 may increase the scale value such that the third space changed from the first space is present inside the second space. For example, as illustrated by reference numeral 1202, the processor 460 may increase the scale value such that the third space (e.g., space 1223) is equal to the second space (e.g., space 1212) or is formed inside the second space.

In an embodiment, when the scale value is set to a larger scale value than the default scale value, the processor 460 may allow the avatar to perform the same motion by an input using a user motion having a smaller size than when the scale value is set to the default scale value. For example, in 1201, when the scale value is set to the default scale value, the processor 460 may obtain an input by the user motion of the user 1213 (or the electronic device 401) moving 1 m in a first direction 1215. Based on the input, the processor 460 may move the avatar corresponding to the user in the virtual space by 1 m in a second direction corresponding to the first direction 1215 in the virtual space. For example, in 1202, when the scale value is set to a scale value at which the third space is identical to the second space, the processor 460 may obtain an input by the user motion of the user 1213 (or the electronic device 401) moving by a distance smaller than 1 m in a first direction 1215. Based on the input, the processor 460 may move the avatar corresponding to the user in the virtual space by 1 m in a second direction corresponding to the first direction 1215 in the virtual space.

In FIG. 12, the first space (e.g., space 1211), the second space (e.g., space 1212), and/or the third space (e.g., space 1223) are illustrated as having a cylindrical shape, but are not limited thereto. For example, the first space and/or the second space may be set in various shapes, including a uniform space shape or a non-uniform space shape.

Figure 13:
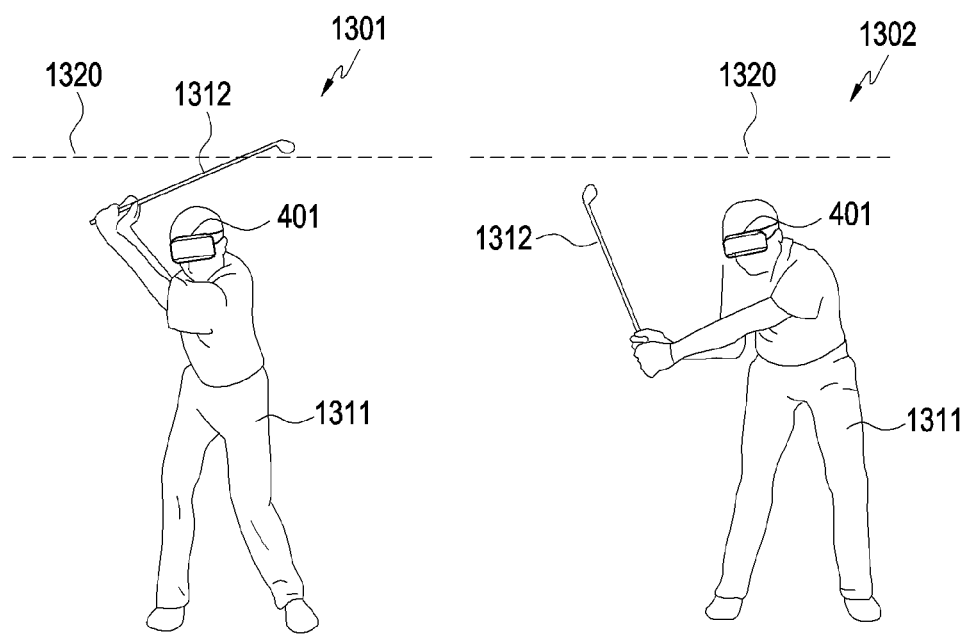
FIG. 13 illustrates an example method for setting a scale value based on a first space and a second space according to an embodiment.

FIG. 13 illustrates an example method for setting a scale value based on a first space and a second space according to an embodiment.

FIG. 13 illustrates a case where the user 1311 executes a golf game as VR content using a golf club-shaped controller 1312 (e.g., the controller 1312 including a 6DoF sensor in a portion corresponding to the head of the golf club).

In an embodiment, at reference numeral 1301, line 1320 may indicate a portion of the line forming the second space (safe zone).

In an embodiment, as illustrated in 1301, when the scale value is set to the default scale value, if the user (or the controller 1312 gripped in the user's hand) performs a motion in the first space to allow the avatar to make a golf swing, the motion of the controller 1312 may deviate to the outside of the line 1320. When the scale value is set to a scale value larger than the default scale value, if the user (or the controller 1312 gripped in the user's hand) performs a motion in the third space within the first space to allow the avatar to swing the golf club, the motion of the controller 1312 may be performed inside the line 1320. When the user performs a motion in the first space as shown in 1301 and when the user performs a motion in the third space as shown by reference numeral 1302, the magnitude and force (or acceleration) of the golf swing performed by the avatar may be the same.

Figure 14:
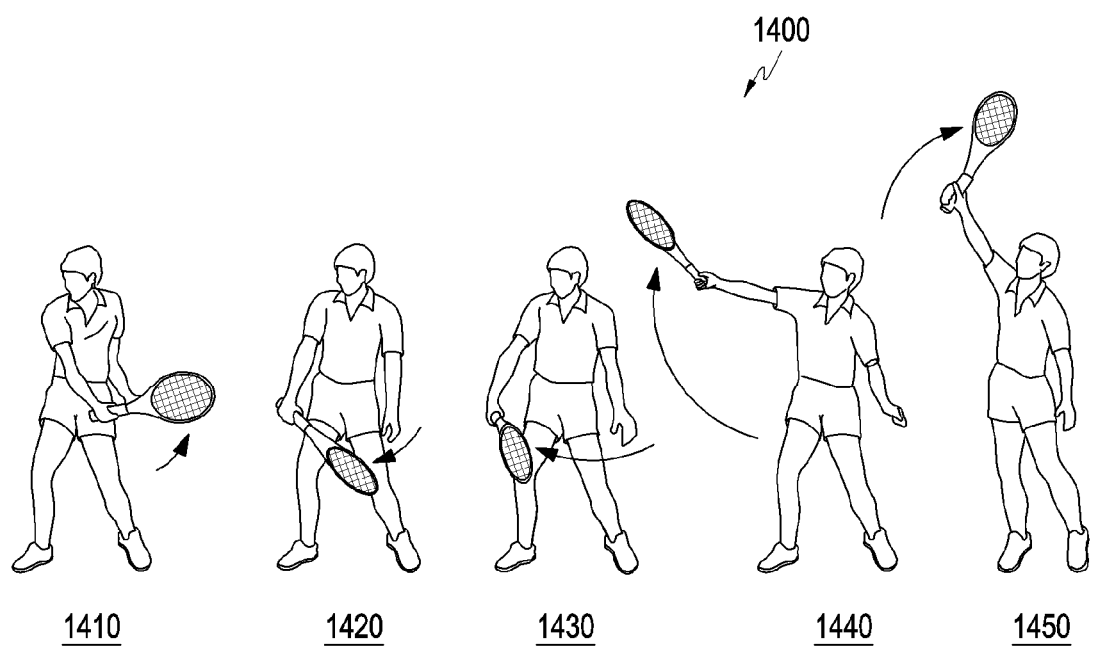
FIG. 14 illustrates an example method for displaying a screen for guiding an avatar's motion performed by a user's motion according to an embodiment.

FIG. 14 illustrates an example method 1400 for displaying a screen for guiding an avatar's motion performed by a user's motion according to an embodiment.

Referring to FIG. 14, in an embodiment, the processor 460 may display an intro screen through the display 440 to adapt the user to the set scale value. For example, when the scale value is changed, the processor 460 may display an intro screen through the display 440 to adapt to the changed scale value. However, without limitations thereto, even when the scale value is not changed, an intro screen to adapt the user to the set scale value may be displayed through the display 440 at the time when the execution of the VR content starts.

In an embodiment, the intro screen may be a screen for guiding the avatar's motion performed by the user's motion.

In an embodiment, the processor 460 may display, through the display 440, the avatar's motion controlled by the user's motion on the intro screen while the user is performing the motion. For example, when the VR content is a tennis game, as illustrated by reference numerals 1410, 1420, 1430, 1440, and 1450 of FIG. 14, the processor 460 may display, through the display 440, an intro screen including the avatar's swing motion performed in real-time according to the user's swing motion. As the intro screen is provided, the user may experience how much the avatar operates by input using the user's motion.

Figure 15:
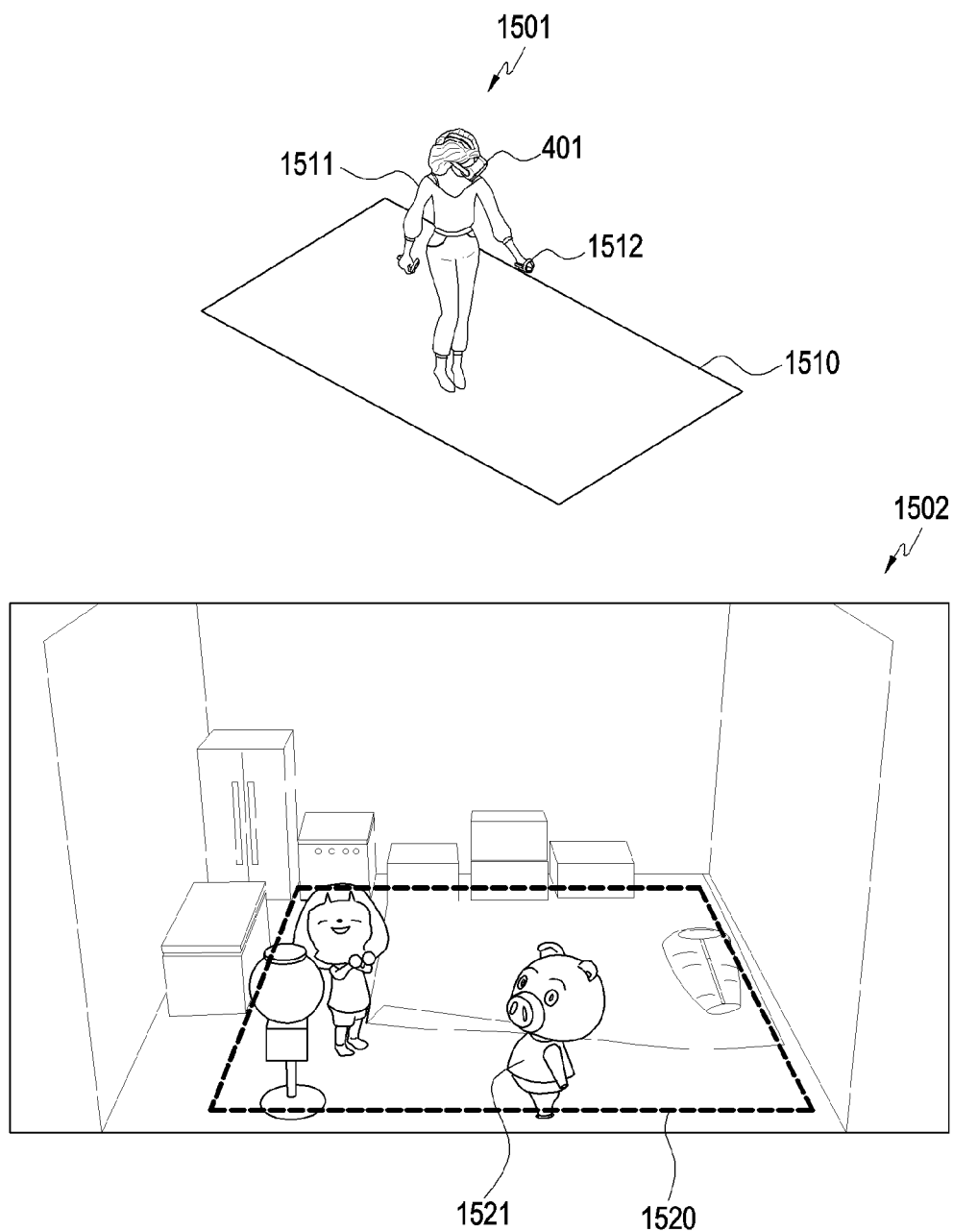
FIG. 15 illustrates an example method for disposing VR content in a virtual space based on a second space according to an embodiment.

FIG. 15 illustrates an example method for disposing VR content in a virtual space based on a second space according to an embodiment.

Figure 16:
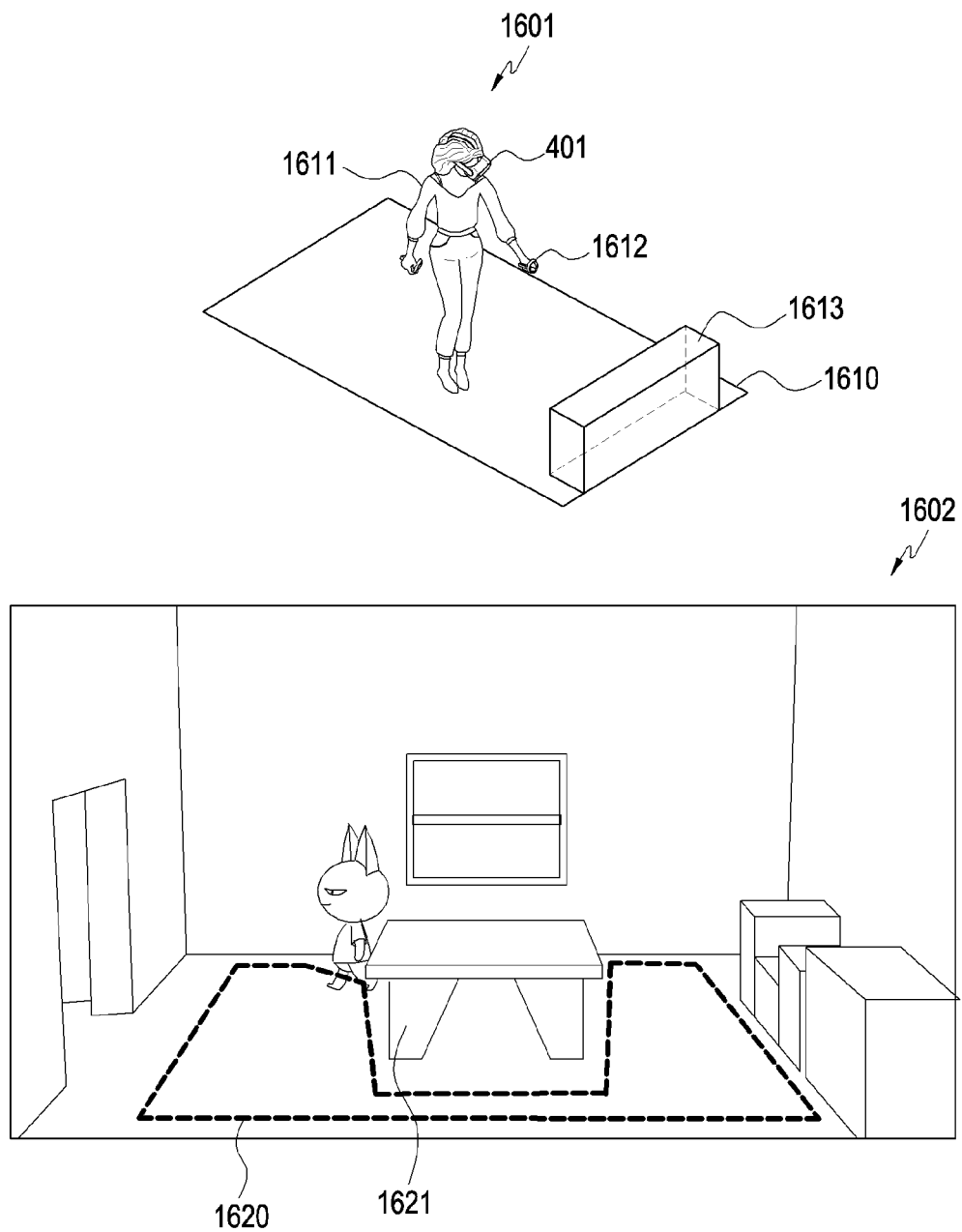
FIG. 16 illustrates an example method for disposing VR content in a virtual space based on a second space according to an embodiment.

FIG. 16 illustrates an example method for disposing VR content in a virtual space based on a second space according to an embodiment.

Referring to FIGS. 15 and 16, in an embodiment, the processor 460 may place an object to be rendered in the VR content based on the second space (safe zone).

In an embodiment, as illustrated by reference numeral 1501, the processor 460 may set the second space 1510 based on an input by the user 1511 on the controller 1512. Reference numeral 1502 may show a virtual space of VR content. The processor 460 may place the controllable object in a space (e.g., 1520) corresponding to the second space 1510 in the virtual space of the VR content such that the user controls the controllable object including the avatar 1521 in the second space 1510 even without adjusting (or setting) the scale value.

In an embodiment, as illustrated by reference numeral 1601, an obstacle 1613 may be placed around the user 1611. The processor 460 may set a non-uniform second space 1610 that does not include the space where the obstacle 1613 is placed. Reference numeral 1602 may show a virtual space of VR content. The processor 460 may place the controllable object in a space 1620 corresponding to the second space 1610 in the virtual space of the VR content such that the user controls the controllable object in the second space 1610 even without adjusting (or setting) the scale value. For example, the processor 460 may place an object 1621 that is uncontrollable by the user in the space of the virtual space corresponding to the space where the obstacle 1613 is placed in the real space. Thus, the user may be prevented from moving to a space outside the second space while being provided with VR content.

According to an embodiment, a method for controlling virtual reality (VR) content by a wearable electronic device 401 may include obtaining a first space necessary for a motion of a user corresponding to a motion of an avatar, the motion of the avatar being performed in a virtual space of the VR content displayed through a display 440 of the wearable electronic device 401. The method may include obtaining a second space for safely performing the motion of the user. The method may include setting a scale value, based on the first space and the second space. The method may include based on obtaining the motion of the user, determining, using the set scale value, a size of the motion of the avatar, the motion of the avatar being performed by the motion of the user.

In an embodiment, obtaining the first space may include obtaining at least one motion of the avatar performable in the VR content and obtaining the first space, based on the at least one avatar motion.

In an embodiment, obtaining the first space may include obtaining at least one space necessary for the user to perform the at least one avatar motion, respectively, and setting the space formed by at least one space as the first space.

In an embodiment, obtaining the first space may include obtaining the first space at the time of executing the VR content, the time when the virtual space is changed in the VR content, the time when a specific scene is changed in the VR content, the time when a specific stage is changed in the VR content, and/or the time when a specific scenario is changed in the VR content.

In an embodiment, obtaining the second space may include obtaining the second space based on an input of the user or the ambient environment of the wearable electronic device 401.

In an embodiment, the scale value comprises a scale factor indicating a relationship between a size of the motion of the user and the size of the motion of the avatar, and as the scale value increases, the size of the motion of the avatar performed by the motion of the user having a same size increases.

In an embodiment, setting the scale value may include comparing the first space and the second space, identifying whether a portion of the first space is present outside the second space, and based on identifying that the portion of the first space is present outside the second space, setting the first scale value larger than a designated scale value for the VR content, as the scale value.

In an embodiment, setting the first scale value as the scale value may include setting the first scale value at which a third space corresponding to the first scale value is identical to the second space or is present in the second space, as the scale value, based on identifying that a portion of the first space is present outside the second space.

In an embodiment, the method may further include displaying an intro screen through the display 440 to allow the user to adapt to the set scale value.

In an embodiment, the method may further include placing an object to be rendered in the VR content based on the second space.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

An embodiment of the disclosure and terms used therein are not intended to limit the technical features described in the disclosure to specific embodiments, and should be understood to include various modifications, equivalents, or substitutes of the embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

What is claimed is:

1. A wearable electronic device comprising:
   a display;
   at least one processor operatively connected to the display; and
   memory storing instructions that, when executed by the at least one processor, cause the wearable electronic device:
      obtain a first space, in a real space, necessary for a motion of a user corresponding to a motion of an avatar, the avatar corresponding to the user and being in a virtual space of virtual reality (VR) content displayed through the display, the motion of the avatar being performed in the virtual space of the VR content,
      obtain a second space, in the real space, for safely performing the motion of the user,
      set a scale value, based on the first space and the second space, and
      based on obtaining the motion of the user, determine, using the set scale value, a size of the motion of the avatar, the motion of the avatar being performed by the motion of the user,
   wherein the scale value comprises a scale factor indicating a relationship between a size of the motion of the user and the size of the motion of the avatar, and
   wherein, as the scale value increases, the size of the motion of the avatar performed by the motion of the user having a same size increases.

2. The wearable electronic device of claim 1, wherein the instructions, when executed by the at least one processor, cause the wearable electronic device to:
   obtain at least one avatar motion performable in the VR content, and
   obtain the first space, based on the at least one avatar motion.

3. The wearable electronic device of claim 2, wherein the instructions, when executed by the at least one processor, cause the wearable electronic device to:
   obtain at least one space necessary for the user to perform the at least one avatar motion, respectively, and
   set a space formed by the at least one space as the first space.

4. The wearable electronic device of claim 1, wherein the instructions, when executed by the at least one processor, cause the wearable electronic device to obtain the first space at a time of executing the VR content, a time when the virtual space is changed in the VR content, a time when a specific scene is changed in the VR content, a time when a specific stage is changed in the VR content, and/or a time when a specific scenario is changed in the VR content.

5. The wearable electronic device of claim 1, wherein the instructions, when executed by the at least one processor, cause the wearable electronic device to obtain the second space based on an input of the user or an ambient environment of the wearable electronic device.

6. The wearable electronic device of claim 1, wherein the instructions, when executed by the at least one processor, cause the wearable electronic device to:
   compare the first space and the second space,
   identify whether a portion of the first space is present outside the second space, and
   set, as the scale value, a first scale value larger than a scale value designated in the VR content, based on identifying that the portion of the first space is present outside the second space.

7. The wearable electronic device of claim 6, wherein the instructions, when executed by the at least one processor, cause the wearable electronic device to set, as the scale value, the first scale value at which a third space corresponding to the first scale value is identical to the second space or is present in the second space, based on identifying that the portion of the first space is present outside the second space.

8. The wearable electronic device of claim 6, wherein the instructions, when executed by the at least one processor, cause the wearable electronic device to display, through the display, an intro screen for adapting the user to the set scale value.

9. The wearable electronic device of claim 1, wherein the instructions, when executed by the at least one processor, cause the wearable electronic device to place, based on the second space, an object to be rendered in the VR content.

10. A method for controlling virtual reality (VR) content by a wearable electronic device, the method comprising:
   obtaining a first space, in a real space, necessary for a motion of a user corresponding to a motion of an avatar, the avatar corresponding to the user and being in a virtual space of VR content displayed through the display of the wearable electronic device, the motion of the avatar being performed in the virtual space of the VR content;
   obtaining a second space, in the real space for safely performing the motion of the user;
   setting a scale value, based on the first space and the second space; and
   based on obtaining the motion of the user, determining, using the set scale value, a size of the motion of the avatar, the motion of the avatar being performed by the motion of the user,
   wherein the scale value comprises a scale factor indicating a relationship between a size of the motion of the user and the size of the motion of the avatar; and
   wherein, as the scale value increases, the size of the motion of the avatar performed by the motion of the user having a same size increases.

11. The method of claim 10, wherein obtaining the first space comprises:
   obtaining at least one avatar motion performable in the VR content; and
   obtaining the first space, based on the at least one avatar motion.

12. The method of claim 11, wherein obtaining the first space comprises:
   obtaining at least one space for the user to perform the at least one avatar motion, respectively; and
   setting a space formed by the at least one space as the first space.

13. The method of claim 10, wherein obtaining the first space comprises obtaining the first space at a time of executing the VR content, a time when the virtual space is changed in the VR content, a time when a specific scene is changed in the VR content, a time when a specific stage is changed in the VR content, and/or a time when a specific scenario is changed in the VR content.

14. The method of claim 10, wherein obtaining the second space comprises obtaining the second space based on an input of the user or an ambient environment of the wearable electronic device.

15. The method of claim 10, wherein setting the scale value comprises:
   comparing the first space and the second space;
   identifying whether a portion of the first space is present outside the second space; and
   setting, as the scale value, a first scale value larger than a scale value designated in the VR content, based on identifying that the portion of the first space is present outside the second space.

16. The method of claim 15, wherein setting the first scale value as the scale value comprises setting, as the scale value, the first scale value at which a third space corresponding to the first scale value is identical to the second space or is present in the second space, based on identifying that the portion of the first space is present outside the second space.

17. The method of claim 15, further comprising displaying, through the display, an intro screen for adapting the user to the set scale value.

18. A non-transitory computer-readable medium having recorded thereon computer executable instructions, wherein the computer executable instructions that, when executed by at least one processor of a wearable electronic device, cause the wearable electronic device to:
   obtain a first space, in a real space, necessary for a motion of a user corresponding to a motion of an avatar, the avatar corresponding to the user and being in a virtual space of virtual reality (VR) content displayed through the display of the wearable electronic device, the motion of the avatar being performed in the virtual space of the VR content,
   obtain a second space, in the real space, for safely performing the motion of the user,
   set a scale value, based on the first space and the second space, and
   based on obtaining the motion of the user, determine, using the set scale value, a size of the motion of the avatar, the motion of the avatar being performed by the motion of the user,
   wherein the scale value comprises a scale factor indicating a relationship between a size of the motion of the user and the size of the motion of the avatar, and
   wherein, as the scale value increases, the size of the motion of the avatar performed by the motion of the user having a same size increases.

* * * * *